United States Patent [19]

Shankar et al.

[11] Patent Number: 4,837,389

[45] Date of Patent: Jun. 6, 1989

[54] COMPOSITE ALLOY STRUCTURES

[75] Inventors: Srinivasan Shankar, Branford; George W. Goward, New Haven, both of Conn.

[73] Assignee: Turbine Components Corporation, Branford, Conn.

[21] Appl. No.: 617,112

[22] Filed: Jun. 4, 1984

[51] Int. Cl.$^4$ .............................................. B32B 15/00
[52] U.S. Cl. .................................. 428/668; 29/402.18; 420/436; 420/437; 420/438; 420/439; 420/440
[58] Field of Search ............... 420/435, 436, 437, 438, 420/439, 440; 428/668; 148/408, 425; 29/402.16, 402.18

[56] References Cited

U.S. PATENT DOCUMENTS

| | | | |
|---|---|---|---|
| 3,399,058 | 8/1968 | Roush | 420/437 |
| 3,988,126 | 10/1976 | DeMusis | 51/100 |
| 4,050,133 | 9/1977 | Cretella et al. | 29/156 |
| 4,115,112 | 9/1978 | Smashey et al. | 420/437 |
| 4,141,127 | 2/1979 | Cretella et al. | 29/156 |

*Primary Examiner*—R. Dean
*Attorney, Agent, or Firm*—Thomas R. Shaffer

[57] ABSTRACT

A dimensional composition, a dimensionally restored alloy structure and a method of dimensionally restoring gas turbine and the like components that will be subsequently coated which includes low-pressure plasma spraying onto a damaged vane or other components, an alloy composition consisting essentially by weight of 1 to 4% aluminum, 0 to 1.5% hafnium and 0 to 20% nickel in the base composition of the cobalt alloy component, grinding to final dimension and diffusion coating. Tantalum is substituted for columbium where the base composition of the alloy contains columbium.

7 Claims, 5 Drawing Sheets

CANDIDATE FOR RECAST

CANDIDATE FOR REAIRFOIL

500 X

500 X

COMPOSITE ALLOY STRUCTURES

This invention relates to alloy compositions, alloy structures and methods of making the same and particularly to recast, reformed or dimensionally restored airfoil structures and methods by which the same is accomplished.

Gas turbine vanes are degraded in service by a variety of deleterious environmental effects which over time cause surface damage to the airfoil. The vane buttresses, on the other hand, are much less effected by the service environment. As a result of this difference in environmental attack, the buttresses from vanes with badly damaged airfoils are frequently salvaged and attached to new airfoils. This process of salvaging the buttress is sometimes referred to as "re-airfoiling".

The re-airfoiling process is commonly used to rebuild vanes that have experienced severe metal loss. Re-airfoiling is also used to salvage vanes whose airfoil surfaces may have simply eroded, corroded or oxidized below permissable limits with moderate thermal fatigue cracking.

We have discovered that this latter category of "badly damaged" gas turbine vanes may be repaired by recasting the surfaces by rebuilding the surfaces under proper condition in situ, and subsequently contouring the recast surfaces by the process set out in U.S. Pat. Nos. 4,050,133 and 4,141,127 using machinery such as disclosed in U.S. Pat. No. 3,988,126.

Recasting of vanes by plasma spraying of parent material onto the vanes has heretofore been proposed. Such practices have met with limited success due to a variety of problems and deficiencies encountered with the practices. Among the most significant deficiencies which have been encountered are the following:

(1) Insufficient bond strength between sprayed layer and parent airfoil.

(2) Excessive porosity in the sprayed layer.

(3) Inadequate durability of diffusion coatings on the sprayed layer of cobalt alloy on cobalt vanes due to oxide formation at the diffusion coatingsprayed layer interface caused by unsatisfactorily high oxygen (oxide) content of the sprayed layer.

We have discovered that these problems can be solved on cobalt base alloy gas turbine engine components and the like, which are subsequently to be coated, by low-pressure plasma spraying onto the surface of the cobalt base alloy article, a like cobalt base alloy which has been modified by the addition of about 1 to 4% by weight of aluminum and by substituting tantalum for all columbium normally present in the alloy. We have also discovered that the addition of 0.2% to 1.5% by weight of hafnium into the recasting alloy to be sprayed improves stability in an oxidation environment. We have further discovered that the inclusion of 5% to 20% of nickel in such alloys appears to stabilize the face center cubic (FCC) form of cobalt and prevents the property change associated with the allotropic FCC-HCP transformation in cobalt without detracting from but, on the contrary, yielding a better diffusion coating on the cobalt base alloy. Preferably, the recast alloy contains about 3% added aluminum. The preferred level of hafnium is about 0.5% and the preferred nickel content is about 10%.

We have set out certain objects, purposes and advantages of this invention in the foregoing general description. Other objects, purposes and advantages of this invention will be apparent from a consideration of the following description and the accompanying drawings in which.

The foregoing drawings illustrate the results of tests of recast vanes according to the following examples, illustrating this invention.

EXAMPLE I

A recasting alloy according to this invention was prepared by modifying the WI-52 alloy (Cr-20-22%, W-10-12%, Ni-1% Max., C-0.4-0.5%, Fe-1.0-2.5%, Cb+Ta-1.5-2.5%, Co-Bal.) in which all columbium from the conventional WI-52 composition was replaced by tantalum and 3% aluminum was added in addition to produce the following compositions:

| | | |
|---|---|---|
| Al-3.09% | W-11.35% | Si-0.45% |
| C-0.49% | Mn-0.52% | Co-Bal |
| Cr-21.41% | Ni-0.10% | $H_2$-0.0015% |
| Fe-0.36% | Ta-2.15% | $O_2$-0.019% |

Figure 1:
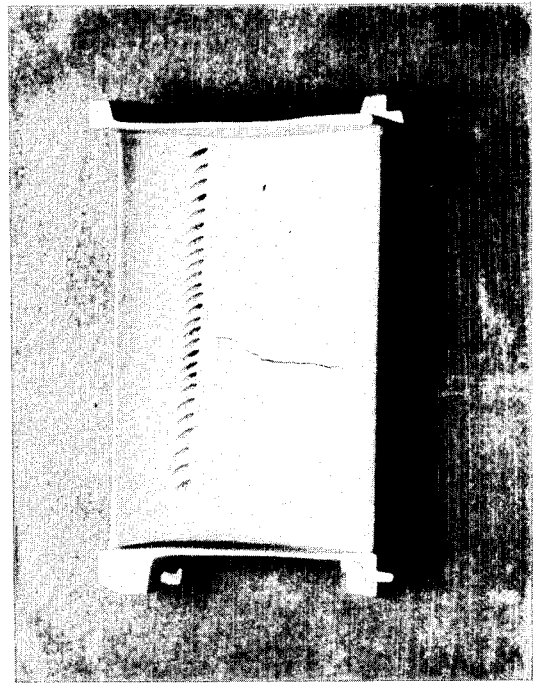
FIG. 1 is a typical badly damaged gas turbine vane which can be repaired by the present invention.
Figure 1:
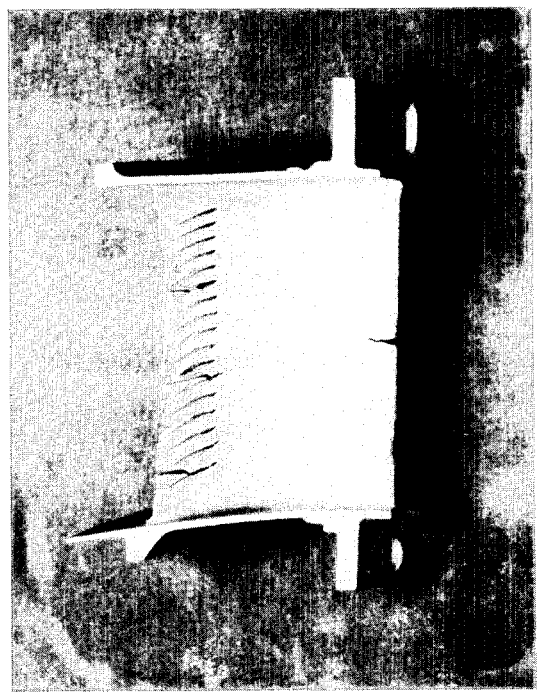
Figure 2:
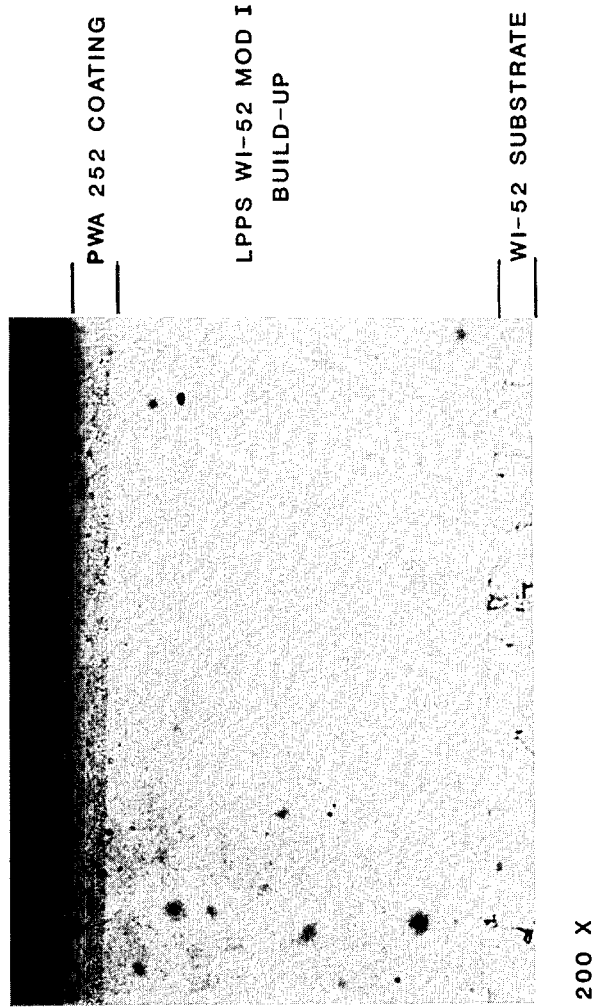
FIG. 2 is a micrograph of a section of vane recast using a WI-52 cobalt alloy with aluminum and tantalum as the recasting alloy.

This alloy was sprayed by using the low-pressure plasma spray process onto damaged WI-52 alloy turbine blades. These vanes were then ground to size and diffusion coated with C-29 coating (equivalent to PWA252). A typical microstructure obtained on the finished recast and coated vane is shown in FIG. 2.

Figure 3:
FIG. 3 is a micrograph of a section as in FIG. 2 with a PWA252 coating compared with an original WI-52 cobalt alloy vane coated with PWA252 coating and subject to 2000° F. static oxidation test.
Figure 3:

These recast vanes were subject to the usual tests including metallography and a 2000° F. static oxidation test and it was found that all of the deficiences previously associated with recase vanes had been overcome and in fact the C-29 coating was found to be unexpectedly more stable in oxidation environment than new coated vanes of unmodified WI-52 alloy in side-by-side tests. A typical micrograph of a WI-52 recast vane according to this invention is shown beside a micrograph of a new WI-52 vane after 2000° F. static oxidation in FIG. 3.

EXAMPLE II

A recasting alloy according to this invention was prepared by modifying a Haynes-25 alloy analysis (Cr-19-21%, W-14-16%, Ni-9-11%, C-0.1, Fe-2 Max., Co-Bal.) in which about 3% aluminum was added to produce the following compositions:

| | |
|---|---|
| Al-3.58% | Mn-1.81% |
| Cr-20.85% | P-0.015% |
| Fe < 0.10% | S-0.006% |
| Ni-9.74% | Si-0 13% |

| | |
|---|---|
| W-14.79% | Co-Bal. |

Figure 4:
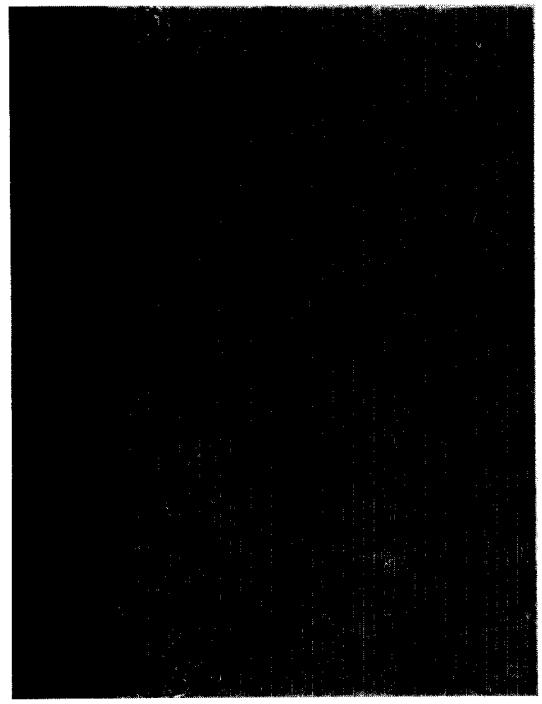
FIG. 4 is a micrograph of HS25 alloy vanes with recast modified H252 alloy and coated with PWA252 coating compared with an original HS25 alloy vane coated with PWA252 and subject to 2000° F. static oxidation test.
Figure 4:
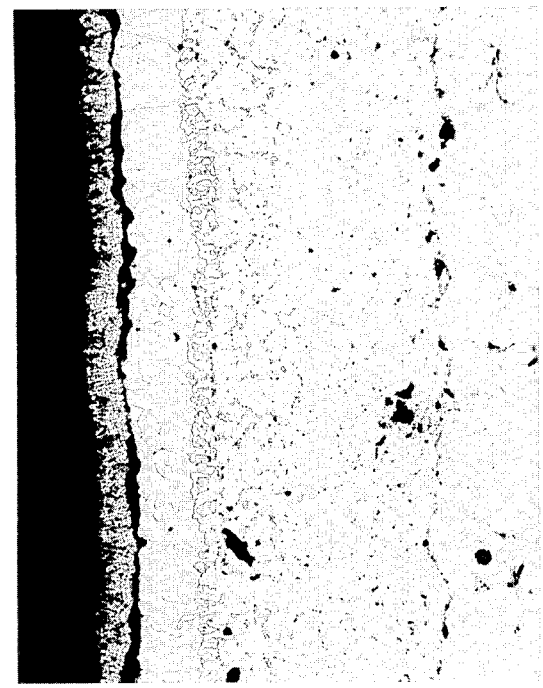

This alloy was sprayed onto damaged Haynes-25 alloy vanes using the low-pressure plasma spray process. The vanes were ground to size and diffusion coated as in Example I and compared with new diffusion coated vanes of Haynes-25 alloy. Typical micrographs of the vanes after the 2000° F. static oxidation tests appear in FIG. 4.

EXAMPLE III

A recasting alloy according to this invention was prepared by modifying the WI-52 alloy analysis to include aluminum and hafnium and tantalum in place of columbium to produce the following composition:

| | |
|---|---|
| Al-3.01% | Ni-1.08% |
| Cr-21.31% | Ta-2.20% |
| Fe-0.11% | W-11.31% |
| Hf-0.54% | Co-Bal. |

Figure 5:
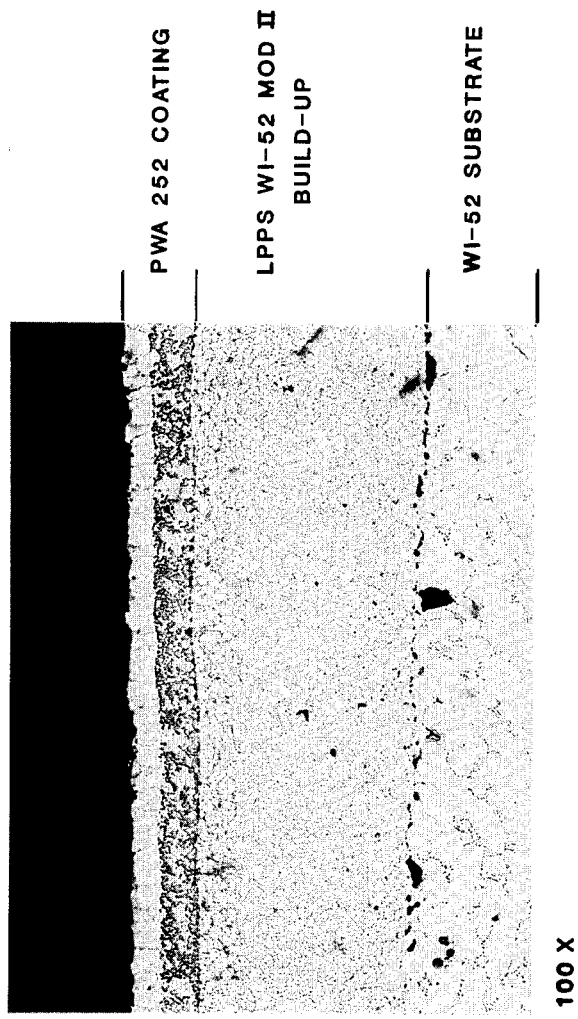
FIG. 5 is a micrograph of a WI-52 vane recast with a modified WI-52 alloy containing aluminum, tantalum and hafnium.

This alloy was sprayed onto damaged WI-52 alloy vanes using the low-pressure plasma spray process. The vanes were ground to size and diffusion coated as in Example I and tested as in the case of Example I. Again, all of the previous deficiencies were overcome and the resultant C-29 coated vane was unexpectedly found to be more stable in an oxidation environment than a C-29 coated new WI-52 alloy vane. A typical micrograph of the product appears in FIG. 5. Other cobalt base alloys such as MAR-M509 (Cr-21.5%, W-7%, Ni-10%, C-0.6%, Ta-3.5%, Ti-0.2%, Co-Bal.), MAR-M302 (Cr-20-23%, W-9-11%, C-0.78-0.93%, Fe-1.5%, Ta-8-10%, Zr-0.1-0.3%, B-0.01, Co-Bal.), FSX414 (Cr-29.5, Ni-10.5, C-0.25, W-7, Co-Bal.), X40 (Cr-22, Ni-10, C-0.5, Fe-1.5, W-7.5, Co-Bal.), X45 (Cr-25, C-0.25, Fe-2 max., W-10.5, Ta-7, Co-Bal.), alloy vane substrates may be similarly repaired with like results.

In the foregoing specification we have set out certain preferred practices and embodiments of our invention, however, it will be understood that this invention may be otherwise embodied within the scope of the following claims.

We claim:

1. A restored article of cobalt base alloy having a surface layer of alloy consisting essentially of an alloy whose composition is substantially the composition of the cobalt base alloy combined with about 1 to 4% aluminum, up to 1.5% hafnium and up to 20% nickel by weight of the base composition of the cobalt alloy article.

2. A restored article as claimed in claim 1 where tantalum is substituted for columbium where present.

3. A restored article of cobalt base alloy as claimed in claim 1 of WI-52 composition having a surface alloy layer consisting essentially of 1 to 4% aluminum, up to 1.5% hafnium and up to 20% nickel in a WI-52 base composition.

4. A restored article as claimed in claim 3 where tantalum is substituted for columbium in the coating alloy.

5. A restored article of cobalt base alloy as claimed in claim 1 having a base of Haynes-25 composition and a surface layer consisting essentially of 1 to 4% aluminum, up to 1.5% hafnium and up to 20% nickel in a Haynes-25 alloy base composition.

6. A restored article as claimed in claim 1 having a base of MAR-M509 composition and a surface layer consisting essentially of 1 to 4% aluminum, up to 1.5% hafnium and up to 20% nickel in a MAR-M509 base composition.

7. A restored article as claimed in claim 1 having a base of MAR-M302 composition and a surface layer consisting of 1 to 4% aluminum, up to 1.5% hafnium and up to 20% nickel in a MAR-M302 base composition.

* * * * *